(12) United States Patent
Putnam et al.

(10) Patent No.: US 9,760,159 B2
(45) Date of Patent: Sep. 12, 2017

(54) DYNAMIC POWER ROUTING TO HARDWARE ACCELERATORS

(71) Applicant: Microsoft Technology Licensing, LLC, Redmond, WA (US)

(72) Inventors: Andrew R. Putnam, Seattle, WA (US); Douglas Christopher Burger, Bellevue, WA (US); Stephen F. Heil, Sammammish, WA (US); Eric S. Chung, Woodinville, WA (US); Adrian M. Caulfield, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 14/682,088

(22) Filed: Apr. 8, 2015

(65) Prior Publication Data
US 2016/0299553 A1    Oct. 13, 2016

(51) Int. Cl.
*G06F 1/32* (2006.01)
*G06F 9/50* (2006.01)

(52) U.S. Cl.
CPC .......... *G06F 1/3287* (2013.01); *G06F 1/3293* (2013.01); *G06F 9/5044* (2013.01);
(Continued)

(58) Field of Classification Search
None
See application file for complete search history.

(56) References Cited

U.S. PATENT DOCUMENTS 6,047,342 A  *  4/2000  Depew ................ G06F 1/3228
                                                        710/2
7,464,278 B2   12/2008  Cohen et al.
(Continued)

OTHER PUBLICATIONS

"International Search Report & Written Opinion Issued in PCT Application No. PCT/US2016/025957", Mailed Date: Jul. 4, 2016, 20 Pages.

(Continued)

*Primary Examiner* — Paul Yanchus, III
(74) *Attorney, Agent, or Firm* — The Watson IP Group, PLC; Vladan M. Vasiljevic

(57) ABSTRACT

Dynamic power routing is utilized to route power from other components, which are transitioned to lower power consuming states, in order to accommodate more efficient processing of computational tasks by hardware accelerators, thereby staying within electrical power thresholds that would otherwise not have accommodated simultaneous full-power operation of the other components and such hardware accelerators. Once a portion of a workflow is being processed by hardware accelerators, the workflow, or the hardware accelerators, can be self-throttling to stay within power thresholds, or they can be throttled by independent coordinators, including device-centric and system-wide coordinators. Additionally, predictive mechanisms can be utilized to obtain available power in advance, by proactively transitioning other components to reduced power consuming states, or reactive mechanisms can be utilized to only transition components to reduced power consuming states when a specific need for increased hardware accelerator power is identified.

20 Claims, 4 Drawing Sheets

(52) U.S. Cl.
CPC ...... *G06F 9/5094* (2013.01); *G06F 2209/509* (2013.01); *Y02B 60/121* (2013.01); *Y02B 60/1282* (2013.01)

(56) References Cited

U.S. PATENT DOCUMENTS

| | | | |
|---|---|---|---|
| 7,774,630 B2 | 8/2010 | Hatasaki et al. | |
| 7,818,499 B2 | 10/2010 | Arakawa et al. | |
| 7,904,287 B2 | 3/2011 | Lefurgy et al. | |
| 8,489,905 B2 | 7/2013 | Smith et al. | |
| 8,612,984 B2 | 12/2013 | Bell et al. | |
| 8,621,248 B1 | 12/2013 | Weber et al. | |
| 8,756,441 B1 | 6/2014 | Mullins et al. | |
| 2006/0112286 A1 | 5/2006 | Whalley et al. | |
| 2006/0288241 A1 | 12/2006 | Felter et al. | |
| 2007/0079161 A1* | 4/2007 | Gupta | G06F 1/3203 713/324 |
| 2008/0104223 A1 | 5/2008 | D'Amora et al. | |
| 2009/0222562 A1 | 9/2009 | Liu et al. | |
| 2013/0138977 A1 | 5/2013 | Herman et al. | |
| 2014/0092112 A1* | 4/2014 | Solomon | G06F 1/3203 345/545 |
| 2014/0189377 A1 | 7/2014 | Subbareddy et al. | |
| 2014/0189413 A1 | 7/2014 | Hasenplaugh et al. | |
| 2015/0089251 A1 | 3/2015 | Carlson et al. | |

OTHER PUBLICATIONS

Vanderster, et al., "Exploiting Task Temperature Profiling in Temperature-Aware Task Scheduling for Computational Clusters", In Proceedings of the 12th Asia-Pacific conference on Advances in Computer Systems Architecture, Aug. 23, 2007, 11 Pages.

Fan, et al., "Power Provisioning for a Warehouse-sized Computer", In Proceedings of the ACM International Symposium on Computer Architecture, Jun. 2007, 11 pages.

* cited by examiner

DYNAMIC POWER ROUTING TO HARDWARE ACCELERATORS

BACKGROUND

Modern computer networking hardware enables physically separate computing devices to communicate with one another orders of magnitude faster than was possible with prior generations of networking hardware. Consequently, it has become more practical to perform digital data processing at locations remote from the user requesting such processing, or on whose behalf such processing is being performed. Large quantities of data processing capability are being aggregated into centralized locations that comprise dedicated hardware and support systems including hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "data center". Because computing devices consume energy and generate heat when performing processing, the aggregation of large quantities of computing devices in a single data center results in large amounts of power consumption and large quantities of heat being generated. Traditionally, to control the costs of providing energy to such computing devices, electrical power delivery components are designed only to be able to safely provide electrical power up to a defined maximum.

SUMMARY

Individual computing devices of a data center can comprise hardware accelerators that can perform defined computational tasks more quickly than generalized central processing units. Such hardware accelerators can consume electrical power in addition to the electrical power consumed by central processing units, such that sizing the electrical power delivery components of a data center to accommodate the power consumption of the hardware accelerators in combination with the central processing units and other power consuming components of server computing devices can be both expensive and wasteful. Accordingly, dynamic power routing can be utilized to route power from other components, which can be transitioned to lower power consuming states, in order to accommodate faster processing of computational tasks on hardware accelerators. Dynamic power routing can, thereby, route power away from components, such as the central processing units, that have offloaded processing to hardware accelerators, and, instead, can route such power to the hardware accelerators that can advantageously perform such processing more efficiently than the central processing units from which such processing was offloaded. In such a manner, hardware accelerators can be incorporated into servers and datacenters whose electrical power delivery components and supply are not provisioned to accommodate simultaneous maximum power consumption from both the existing server computing device components and such hardware accelerators. Dynamic power routing can include the determination of whether or not to transition the processing of at least a portion of the workflow from generalized central processing units to the targeted processing units of hardware accelerators, a determination that can be informed by current power consumption, anticipated power consumption, available power routing implementations, workload or job priority, hints from code compilers and profilers and other like information. Once a portion of a workflow is being processed by one or more hardware accelerators, the workflow, or the hardware accelerators, can be self throttling to stay within power thresholds, or they can be throttled by independent coordinators that can operate within the context of a single computing device, or across a system of multiple computing devices. Additionally, predictive mechanisms can be utilized to obtain available power in advance, by proactively transitioning other components to reduced power consuming states, or reactive mechanisms can be utilized to only transition components to reduced power consuming states when a specific need for increased hardware accelerator power is identified or when a specific type of workload is initiated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
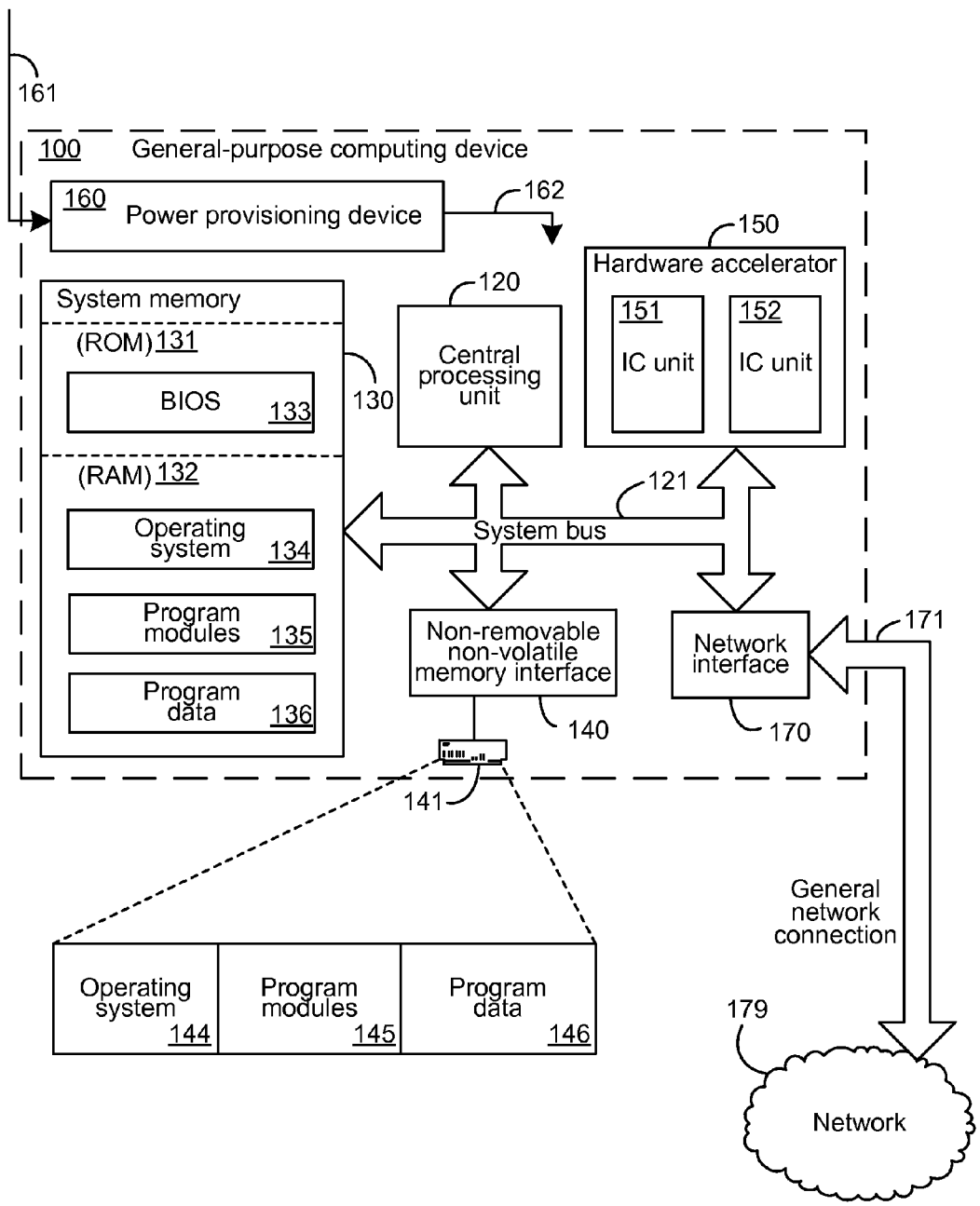
FIG. 1 is a block diagram of an exemplary computing device comprising an exemplary hardware accelerator.

The following description relates to dynamically routing power to accommodate the processing of at least a portion of a computer-executable workflow on one or more hardware accelerators that are optimized for such processing. Power can be routed by deactivating, or placing into reduced power consuming states, other components of a computing device hosting such hardware accelerators. In such a manner, hardware accelerators can be incorporated into servers and datacenters whose electrical power delivery components and supply are not provisioned to accommodate simultaneous maximum power consumption from both the existing server computing device components and such hardware accelerators. Dynamic power routing can include the determination of whether or not to transition the processing of at least a portion of the workflow from generalized central processing units to the targeted processing units of hardware accelerators, a determination that can be informed by current power consumption, anticipated power consumption, available power routing implementations, workload or job priority, hints from code compilers and profilers and other like information. Once a portion of a workflow is being processed by one or more hardware accelerators, the workflow, or the hardware accelerators, can be self throttling to stay within power thresholds, or they can be throttled by independent coordinators that can operate within the context of a single computing device, or across a system of multiple computing devices. Additionally, predictive mechanisms can be utilized to obtain available power in advance, by proactively transitioning other components to reduced power consuming states, or reactive mechanisms can be utilized to only transition components to reduced power consuming states when a specific need for increased hardware accelerator power is identified or when a specific type of workload is initiated.

The techniques described herein make reference to hardware accelerators, such as are comprised of customized, typically task-specific, processing circuitry, which traditionally performs specific processing tasks more quickly and efficiently then general-purpose central processing units. However, the mechanisms described are not limited specifically to hardware accelerators, and can be utilized to dynamically route power to any computing system, or subsystem, to enable the use of less robust power delivery components and supply.

As utilized herein, the term "power" means electrical power, such as is consumed by transistor-based processing circuitry. Additionally, as utilized herein, the term "maximum rated power" means a maximum or upper threshold quantity of electrical power that a particular electrical power delivery component has been independently certified to safely deliver. Such maximum rated power designations are common in the electrical power supply and delivery fields and would be well known to those skilled in the art. Indeed, electrical power delivery components and supply are typically referred to by their "maximum rated power", such as, for example, a 100 W (watt) power supply, a 50 A (amp) electrical service, and the like.

As utilized herein, the term "hardware accelerator" means any collection of processing circuitry that is specifically optimized to perform a discrete subset of computer processing operations, or execute a discrete subset of computer-executable instructions, in an accelerated manner faster or with more efficient power utilization than such operations would be performed, or such instructions would be executed, by a general-purpose central processing unit that was not so specifically optimized. Consequently, as utilized herein, the adjective "more efficient" means either faster or with more efficient power utilization.

Although not required, the descriptions below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, servers, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated which can perform some or all of the mechanisms and actions described below. The exemplary computing device 100 can include both conventional computing hardware, such as will be detailed below, and a hardware accelerator, such as the exemplary hardware accelerator 150. As indicated previously, a hardware accelerator comprises processing circuitry that is specifically optimized to perform a discrete subset of computer processing operations, or execute a discrete subset of computer-executable instructions, in an accelerated manner faster or with more efficient power utilization than such operations would be performed, or such instructions would be executed, by a general-purpose, or generalized, central processing unit that was not so specifically optimized, such as, for example, one of the one or more central processing units (CPUs) 120.

For purposes of illustration, the exemplary hardware accelerator 150, shown in FIG. 1, is illustrated as comprising multiple integrated circuits, such as exemplary integrated circuits 151 and 152. Such integrated circuits can include Application-Specific Integrated Circuits (ASICs), Field Programmable Gate Arrays (FPGAs) or other Very Large Scale Integrated circuits (VLSIs). The integrated circuits 151 and 152 of the exemplary hardware accelerator 150 can be specifically optimized to perform a discrete subset of computer processing operations, or execute a discrete subset of computer-executable instructions, in an accelerated manner. For example, the exemplary hardware accelerator 150 can be optimized to perform video compression. As another example, the exemplary hardware accelerator 150 can be optimized to execute specific ranking algorithms. In instances where the exemplary hardware accelerator 150 is utilized to, for example, execute a ranking algorithm, the execution of such a ranking algorithm can be passed from the exemplary CPU 120 to the exemplary hardware accelerator 150, thereby leaving the CPU 120 available to perform other processing until the hardware accelerator 150 returns the results of the ranking algorithm it executed.

Turning to the rest of the exemplary computing device 100, in addition to the exemplary CPU 120, and the exemplary hardware accelerator 150, the exemplary computing device 100 can further comprise a system memory 130, and a system bus 121 that couples various system components including the system memory to the processing unit 120 and the hardware accelerator 150. The system bus 121 may be any of several types of bus structures including a memory bus or memory controller, a peripheral bus, and a local bus using any of a variety of bus architectures. Depending on the specific physical implementation, one or more of the CPUs 120, the hardware accelerator 150, the system memory 130 and other components of the computing device 100 can be physically co-located, such as on a single chip or silicon die or on a single circuit board. In such a case, some or all of the system bus 121 can be nothing more than silicon pathways within a single chip structure or on a single die and its illustration in FIG. 1 can be nothing more than notational convenience for the purpose of illustration.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media, as defined and delineated above. The hard disk drive 141 is typically connected to the system bus 121 through a non-volatile memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is illustrated as being connected to the general network connection 161 through a network interface or adapter 160, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 161. It will be appreciated that the network connections shown are exemplary and other means of establishing a communications link between computing devices may be used.

Of relevance to the descriptions below, the exemplary computing device 100 can comprise one or more power provisioning devices, such as the exemplary power provisioning device 160. According to one aspect, the power provisioning device 160 can be a Power Supply Unit (PSU) rated to be able to safely supply a defined maximum amount of electrical power. Other power provisioning devices that can be utilized with the exemplary computing device 100 can include power distribution units, fuses, power supply panels or circuit breaker boxes, the electrical power feed itself, such as would be received from an electric utility, backup power supplies, including batteries and battery-fed backup power supplies, and other like power provisioning devices. As illustrated in FIG. 1, electrical power can be sourced from outside the power provisioning device 160, as illustratively represented by the arrow 161, and can be provided, by the power provisioning device 160, to electric-power-consuming components of the exemplary computing device 100, as illustratively represented by the arrow 162.

Although described as a single physical device, the exemplary computing device 100 can be a virtual computing device, in which case the functionality of the above-described physical components, such as the CPU 120, the system memory 130, the network interface 160, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 100 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

According to one aspect, one or more power provisioning devices, such as the exemplary power provisioning device 160, can have a maximum rated power that is less than the aggregate power consumption of the other components of the exemplary computing device 100, should such components be fully utilized. As will be recognized by those skilled in the art, certain components, such as the exemplary CPU 120, and the exemplary hardware accelerator 150, can consume a variable amount of electrical power depending upon the nature and quantity of the processing being performed by such processors. For example, at idle, the exemplary CPU 120, and the exemplary hardware accelerator 150 may only consume a few watts of electrical power each. However, when performing intensive processing, such as the execution of computer-executable instructions continuously at a high frequency for an extended period of time, electrical power consumption of the exemplary CPU 120, and the exemplary hardware accelerator 150, can increase dramatically. For example, the exemplary CPU 120 can consume fifty watts or more of electrical power when performing intensive processing. The exemplary hardware accelerator 150 can have an even more dramatic increase in power consumption as the processing performed by such a hardware accelerator 150 increases. For example, the exemplary hardware accelerator 150 can consume over one hundred watts when performing intensive processing.

As indicated above, the power provisioning device 160 can have a maximum rated power that is less than the aggregate power consumption of the other components of the exemplary computing device 100, should such components be fully utilized. For example, an exemplary power supply unit can have a maximum rated power of 250 W. Continuing with such an example, the exemplary computing device 100 can comprise six CPUs, such as exemplary CPU 120, each of which can consume thirty watts of electrical power when performing intensive processing. Other components of the exemplary computing device 100, such as the exemplary hard disk drives 141, and exemplary network interface 170, can, themselves, consume at least twenty watts of electrical power. As can be seen from such a simple, exemplary set up, if all six of the exemplary CPUs are each consuming thirty watts of electrical power, and the other components are consuming twenty watts of electrical power, then only fifty remaining watts can be sourced by the exemplary power provisioning device 160, with the exemplary maximum rated power of 250 W. Should the exemplary hardware accelerator 150 be tasked with intensive processing, the exemplary maximum rated power of 250 W would, very likely, be quickly exceeded, and the exemplary power provisioning device 160, or some other component in the power provisioning path, would fail or otherwise operate sub-optimally.

However, equipping a computing device, such as the exemplary computing device 100, with a power provisioning device 160 that has a maximum rated power that is greater than an aggregate of the maximum power that can be consumed by each of the components of the exemplary computing device 100 can be prohibitively expensive. Furthermore, because at least some of the CPUs or hardware accelerators will not be continuously utilized to perform intensive processing, it is likely that a computing device, such as exemplary computing device 100, will only rarely utilize such a power provisioning device's higher capacity. Therefore, the mechanisms described herein enable the utilization of hardware accelerators, such as exemplary hardware accelerator 150, without the need to equip computing devices, such as exemplary computing device 100, with higher capacity power provisioning devices, such as exemplary power provisioning device 160.

Figure 2:
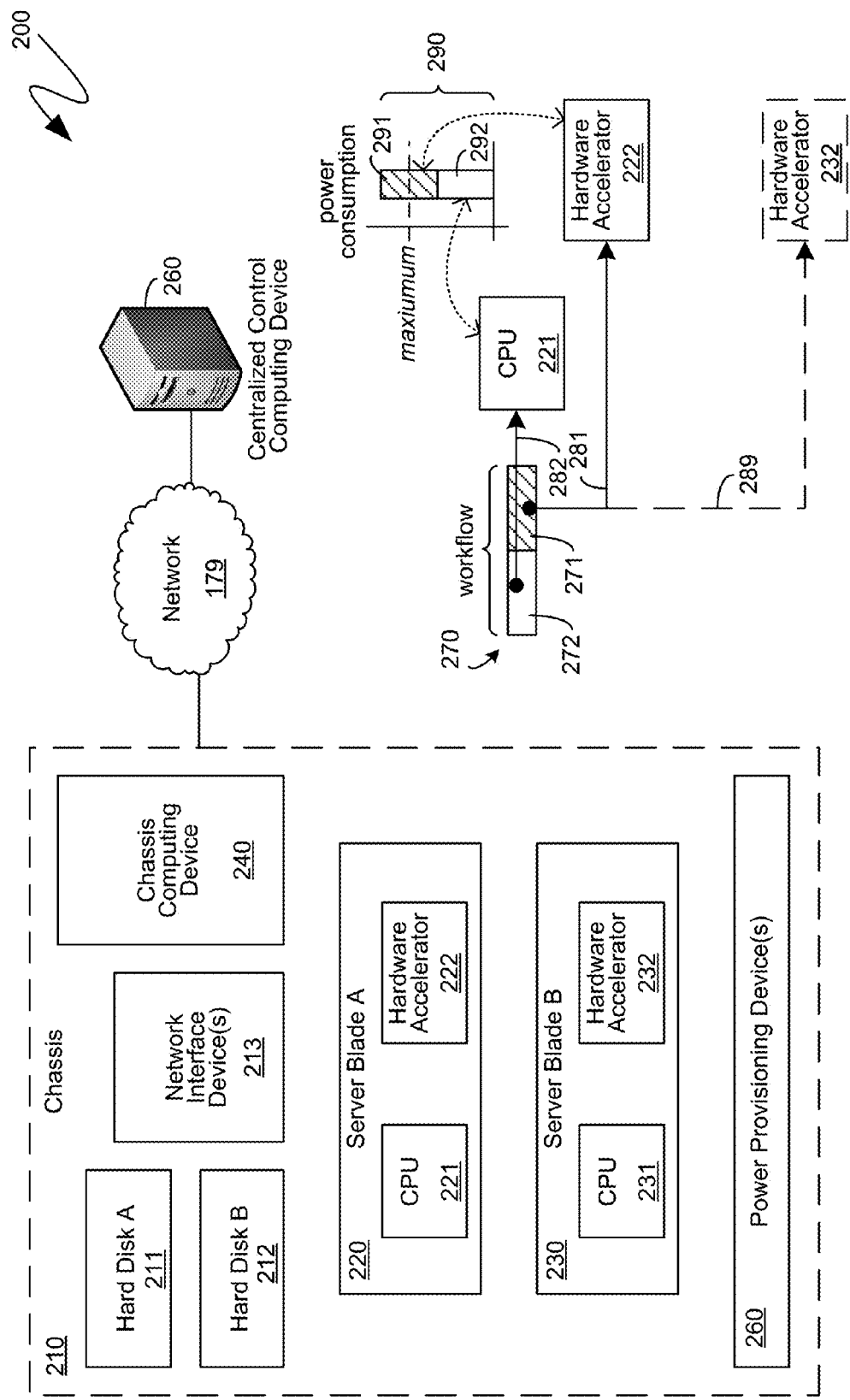
FIG. 2 is a block diagram of an exemplary chassis within which power can be routed to accommodate hardware accelerators.

Turning to FIG. 2, the exemplary system 200 shown therein illustrates a multi-computing device chassis, such as would typically be found in a data center, in the form of the exemplary chassis 210. Additionally, the exemplary system 200 of FIG. 2 further illustrates a separate control computing device, in the form of the exemplary centralized control computing device 260, which can be communicationally coupled to the exemplary chassis 210 through a network, such as the network 179 described above.

As illustrated by the system 200 of FIG. 2, the exemplary chassis 210 can comprise one or more server blades, such as the exemplary server blades 220 and 230. As will be recognized that those skilled in the art, server blades can be server computing devices, having componentry analogous to at least some of the componentry of the exemplary computing device 100, described in detail above and illustrated in FIG. 1, except that such server computing devices can be physically configured in the form of a "blade", or other physical arrangement in which components are spread out along two dimensions thereby facilitating stacking of multiple such server computing devices within a single chassis, such as the exemplary chassis 210. For simplicity of illustration, rather than showing each component of the server blades, FIG. 2 only illustrates the CPUs and hardware accelerators of the exemplary server blades 220 and 230 that are shown therein, namely the CPUs 221 and 231, and the hardware accelerators 222 and 232, respectively. Additionally, while the exemplary chassis 210 is illustrated as comprising two server blades, namely the exemplary server blades 220 and 230, those of skill in the art will recognize that typical chassis in a data center environment can comprise many more server blades, and the descriptions below are independent of the quantity of server blades within a specific chassis.

The exemplary chassis 210, shown in FIG. 2, can also comprise components that can be utilized by, and shared between, various server blades of the exemplary chassis 210. For example, the exemplary chassis 210 can comprise storage devices, such as the exemplary hard disks 211 and 212. Alternatively, or in addition, such storage devices can be part of the individual server blades, such as the exemplary server blades 220 and 230. The exemplary chassis 210 can also comprise network interface devices, such as the exemplary network interface device 213. As will be recognized by those skilled in the art, network interface devices can include network interface cards, routers, network cabling, switches, and other like network interface devices. According to one aspect, the chassis 210 can comprise a separate computing device, such as exemplary chassis computing device 240, that can manage the other components of the chassis, including the processing tasks assigned to various server blades of the chassis. Additionally, a chassis, such as exemplary chassis 210, can comprise one or more power provisioning devices, such as the exemplary power provisioning device 260, which, as indicated previously, can be a power supply unit, a power transfer switch, a backup power generator, or other like power provisioning device.

To provide context for the descriptions below, one or more server blades of a chassis, such as the exemplary server blade 220 of the exemplary chassis 210, can be assigned a "workflow", such as exemplary workflow 270. As utilized herein, the term "workflow" means a sequence of computer-executable instructions that perform a computing task or result in a computed determination. The exemplary workflow 270 can comprise a portion 271 that can be performable more efficiently by a hardware accelerator, such as the exemplary hardware accelerator 222, than it could be performed by a generalized processor, such as the exemplary CPU 221. For example, the portion 271, of the exemplary workflow 270, can comprise a compression function, and the hardware accelerators, such as exemplary hardware accelerator 222, can be optimized to execute the computer-executable instructions performing such a compression function more efficiently than the exemplary CPU 221. As another example, the portion 271, of the exemplary workflow 270, can comprise a ranking algorithm, and the exemplary hardware accelerators, such as exemplary hardware accelerator 222, can be optimized to execute the computer-executable instructions performing such a ranking algorithm more efficiently than the exemplary CPU 221.

Furthermore, if the portion 271, of the exemplary workflow 270, were to be provided to a hardware accelerator to be executed thereby, such as the exemplary hardware accelerator 222, as illustrated by the arrow 281, a subsequent portion 272, of the workflow 270, or a portion of a different workflow, could then be provided to the CPU 221, as illustrated by the arrow 282, since the CPU 221 can have been freed from executing the computer-executable instructions associated with the portion 271, of the workflow 270, which was assigned to be executed by the hardware accelerator 222. In such a manner, the utilization of hardware accelerators can not only perform specific portions of the workflow, such as exemplary portion 271, more efficiently than a generalized processing unit, but by assigning that portion of the workflow to a hardware accelerator, the generalized processing unit can be freed to perform other tasks so long as the total power consumed does not exceed the maximum power capability of the system. For example, the generalized processing unit can execute other computer-executable instructions, including computer-executable instructions associated with other portions of the same workflow, such as the exemplary portion 272.

However, as indicated previously, the utilization of a hardware accelerator, such as the exemplary hardware accelerator 222, can exceed the capacity of power provisioning devices, such as the exemplary power provisioning device 260, to properly provide power to the various processing units, and other components of the server blades and/or the chassis. For example, as illustrated in FIG. 2, the execution of computer-executable instructions associated with the workflow 270, by the CPU 221, can result in a power consumption amount 292 that can be below a maximum rated power, such as one or more of the power provisioning devices 260. However, utilization of the hardware accelerator 222 to, for example, execute at least a portion 271 of the workflow 270, can result in an additional power consumption amount 291 such that the aggregate power consumption 290 can exceed a maximum rated power of one or more of the power provisioning devices 260.

To accommodate the processing, by hardware accelerator, of at least a portion of the workflow 270, dynamic power routing mechanisms can be employed. According to one aspect, such dynamic power routing mechanisms can comprise the reduction of the power consumption of other components, such as the exemplary CPU 221, thereby bringing an aggregate power consumption 290 below the maximum rated power of one or more of the power provisioning devices 260. Dynamic power routing mechanisms can also comprise the transfer 289 of the processing of a portion of the workflow 270, such as the exemplary portion 271, to a different hardware accelerator, such as the exemplary hardware accelerator 232, that may be on a different server blade, a different chassis, or otherwise drawing power from different power provisioning devices, such that power consumption by the hardware accelerator 232 will both not increase an aggregate power consumption of a host device of the hardware accelerator 232 beyond the maximum rated power of a corresponding power provisioning device, and will enable the original computing device, such as the exemplary server blade 220, to continue operating without transitioning any of its components to lower power consuming states.

Figure 3:
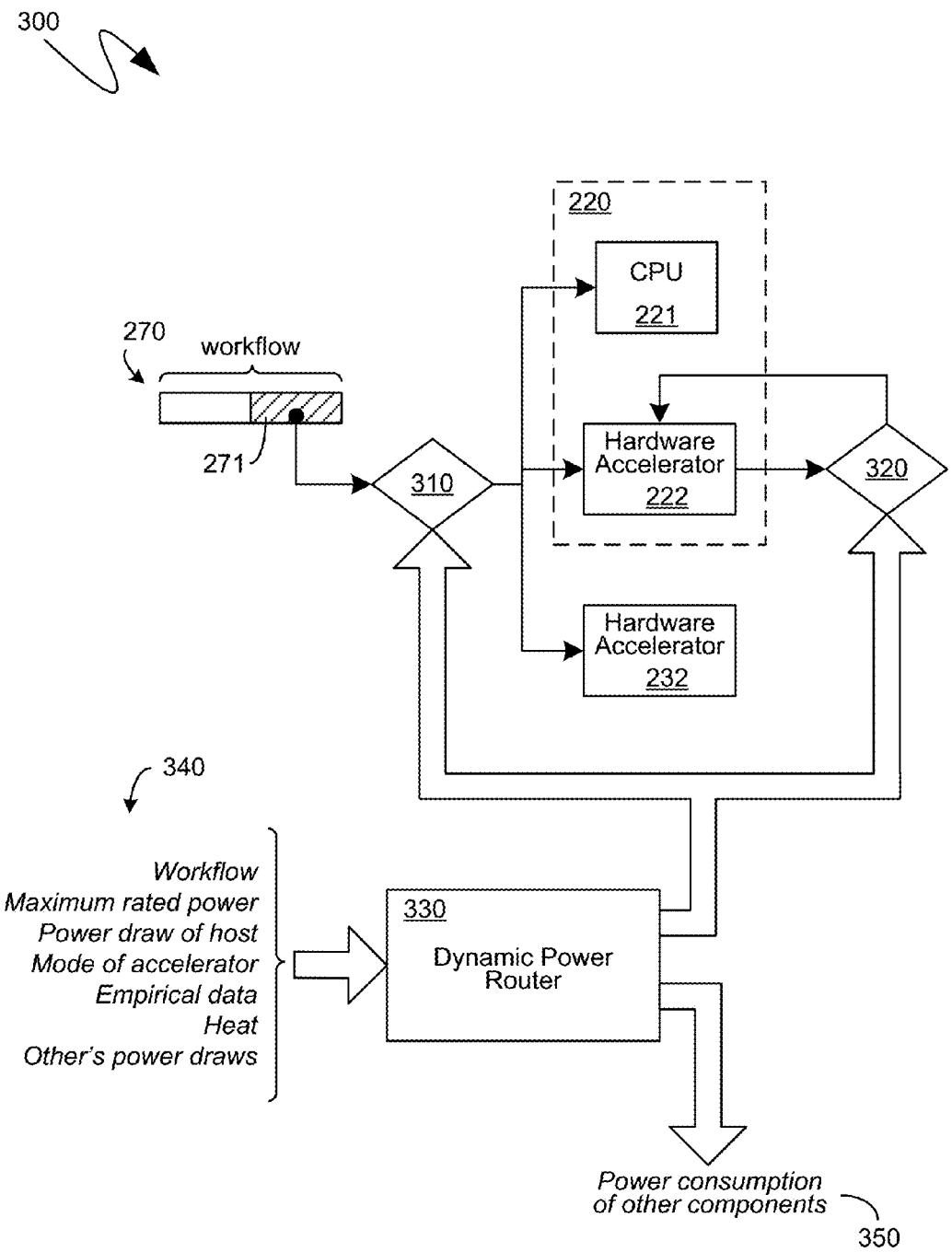
FIG. 3 is a diagram of exemplary components for routing power to accommodate hardware accelerators.

Turning to FIG. 3, the system 300 shown therein illustrates aspects of the operation of a dynamic power router, such as the exemplary dynamic power router 330. To provide context for the system 300, the exemplary workflow 270, described previously, is illustrated, comprising a portion 271 that can be executed by one or more hardware accelerators. As indicated previously, the hardware accelerators can be specifically designed to optimize execution of the computer-executable instructions that comprise the portion 271, thereby executing the portion 271 more quickly or with more efficient power utilization than generalized processing units. Thus, an initial step, not explicitly illustrated in FIG. 3, can be the determination of those portions of a workflow, such as exemplary portion 271, that are executable by hardware accelerators more efficiently than by generalized processing units. According to one aspect, such portions of workflows can be explicitly identified by the software developers generating such workflows. For example, interfaces can be provided that such software developers can invoke to request that an identified portion of a workflow can be executed by hardware accelerators, if possible. In another aspect, portions of a workflow that can be accelerated by hardware accelerators can be detected by searching for specific combinations of computer-executable instructions, or specific routines that are amenable to execution by the hardware accelerators, given the design of the hardware accelerators.

Once a portion that can be executed by a hardware accelerator, such as the exemplary portion 271, of a workflow, such as the exemplary workflow 270, has been identified, a decision can be made, as illustrated in FIG. 3 by the decision 310, as to whether such a portion 271 will actually be provided to a hardware accelerator, to be accelerated thereby, or will be executed by a generalized processing unit, such as the generalized processing unit currently executing other portions of the workflow 270. As illustrated in FIG. 3, such a determination can be made by a dynamic power router, such as the exemplary dynamic power router 330, based upon power-centric inputs 340. More specifically, according to one aspect, the dynamic power router 330 can make the decision 310 based upon whether a sufficient amount of power could be provided to a hardware accelerator that could be tasked with executing the portion 271, without exceeding the maximum rated power of corresponding power provisioning devices. As such, one of the power-centric inputs 340 that can be received by the dynamic power router 330 can be a maximum rated power of the relevant power provisioning devices.

Another of the power-centric inputs 340 can be a current power draw of a host computing device, such as the exemplary computing device 220, whose CPU, such as the exemplary CPU 221, is currently executing the workflow 270. For example, if the computing device 220 has a power draw that is sufficiently low that the portion 271, of the workflow 270, could be executed by a hardware accelerator that is also part of such a computing device 220, such as the exemplary hardware accelerator 222, without exceeding the maximum rated power, then the dynamic power router 330 can implement the decision 310 and can allow such a portion 271 to execute on the hardware accelerator 222.

If the dynamic power router 330 determines that the power draw of the host computing device, such as the exemplary computing device 220, is too high to accommodate the additional power draw of a hardware accelerator, such as the exemplary hardware accelerator 222, without exceeding the maximum rated power of at least one power provisioning device providing power to such a computing device 220, the dynamic power router 330 can proceed to further determine whether other components of the computing device 220 can be reduced to lower power consuming states in order to "make room" under the maximum rated power threshold for the hardware accelerator 222. In so doing, the dynamic power router 330 can implement various power reduction mechanisms and strategies to reduce the power consumption of other components or portions of those components, such as specific cores of one or more generalized processing units of the computing device 220. For example, the dynamic power router 330 can instruct the CPU 221 to transition to a lower power consuming mode. As will be recognized by those skilled in the art, such a lower power consuming mode can result in the CPU 221 executing instructions more slowly or utilizing only a fraction of its cores to perform processing, if the CPU 221 is a multicore processor. As another example, the dynamic power router 330 can deactivate individual processors, such as by deactivating the sockets through which such processors are communicationally coupled with a motherboard, in computing environments comprising multiple discrete processors. Other components can, likewise, be transitioned to lower power states, or deactivated entirely to conserve power for a period of time during which a hardware accelerator, such as exemplary hardware accelerator 222, can be executing. Such other components can include, for example, storage devices, such as magnetic or solid-state hard disk drives, networking components, such as network interface cards, and other chassis or computing device components.

According to one aspect, to determine how much power a hardware accelerator may consume in executing the portion 271, a dynamic power router, such as the exemplary dynamic power router 330, can take into account the different processing modes of the hardware accelerator and their respective power draws. More specifically, and as will be recognized by those skilled in the art, hardware accelerators can execute computer-executable instructions at different speeds and throughputs in accordance with different processing or execution modes, sometimes called "hot" modes or "cold" modes, and a single hardware accelerator can be capable of transitioning among multiple such modes, often in response to the types of computer-executable instructions it is executing or in response to explicit instructions received from the execution of such computer-executable instructions. Thus, as indicated by the exemplary power-centric inputs 340, empirical data indicative of the power consumption of a hardware accelerator when operating in different processing modes can be part of the information that is provided to the dynamic power router 330.

Utilizing such information, together with information regarding the processing modes of the hardware accelerator, and which modes would be required, or be desired, to execute the portion 271 on the hardware accelerator, the dynamic power router 330 can determine whether it can alter the power consumption of other components 350 to accommodate the power consumption of a hardware accelerator. For example, if the dynamic power router 330 identifies the portion 271 as comprising computer-executable instructions that can be executed by a hardware accelerator operating only in a low power, or "cold" mode, then the dynamic power router 330 can determine that additional power can be made available for such a hardware accelerator by changing the power consumption of other components 350 in a manner that generates only a minimal impact. In such an example, the dynamic power router 330 can implement the decision 310 and can allow such a portion 271 to execute on a local hardware accelerator such as, for example, the hardware accelerator 222 of the computing device 220 on which the workflow 270 is currently being executed. By contrast, if the dynamic power router 330 identifies the portion 271 as comprising computer-executable instructions that are desired to be executed by a hardware accelerator operating in a highest power consumption mode, the dynamic power router 330 may determine that it cannot sufficiently alter the power consumption of other components 350 to accommodate the power consumption that will be consumed by a local hardware accelerator, such as the hardware accelerator 222. In such an instance, the dynamic power router 330 can implement the decision 310 to transition the execution of the portion 271, of the workflow 270, to a hardware accelerator external to the computing device 222, on which the workflow 270 was being executed, such as, for example, the hardware accelerator 232. Alternatively, the dynamic power router 330 can implement the decision 310 to maintain execution of the workflow 270 on the CPU 221, and not send the portion 271 to be executed by the hardware accelerator.

According to one aspect, the dynamic power router 330, in addition to identifying one or more hardware accelerators that can execute a portion of a workflow, such as the exemplary portion 271 of the exemplary workflow 270, without exceeding a maximum rated power of one or more power provisioning devices, can also control the power consumption of other components 350 to enable the hardware accelerators to consume power without exceeding the maximum rated power of the one or more power provisioning devices. Such control of the power consumption of other components 350 can be implemented either in a reactive, or in a predictive, manner, or in combinations thereof.

In predictive operation, the dynamic power router 330 can anticipate the power needs of a hardware accelerator and can proactively adjust the power consumption of other components 350 to accommodate the anticipated power consumption of the hardware accelerator. For example, prior to directing the hardware accelerator 222 to execute the portion 271 of the workflow 270, the dynamic power router 330 can transition other components of the computing device 220 to lower power consumption states such that, when the hardware accelerator 222 begins executing the portion 271, the increased aggregate power consumption of the computing device 220, now including the power consumption of the hardware accelerator 222, can still remain below the maximum rated power of one or more power provisioning devices. As indicated previously, the dynamic power router 330 can determine which processing mode the hardware accelerator 220 would use to execute the portion 271, such as based upon which interfaces were invoked by the workflow 270, and can determine, from such a processing mode, and empirical data, a power consumption of the hardware accelerator 222 in executing the portion 271. The power consumption of other components 350 can then be proactively reduced, by the dynamic power router 330, so that the expected power consumption of the hardware accelerator 222, in combination with the power consumption of the other components 350, will not exceed the maximum rated power of one or more of the power provisioning devices.

In reactive operation, the dynamic power router 330 can receive requests, from the portion of the workflow 271 executing on the hardware accelerator 222, for additional power so that the hardware accelerator 222 can transition to a more power consuming execution mode, and can make a decision 320 whether to require the hardware accelerator to maintain its current execution mode, or whether to, at that time, reduce the power consumption of other components 350, thereby enabling the hardware accelerator 222 to transition to a more power consuming execution mode.

According to one aspect, the portion 271, or the hardware accelerator 222 itself, can be self-throttling to avoid exceeding defined power consumption limitations. For example, the dynamic power router 330 can identify the quantity of power that the hardware accelerator 222 can consume, in executing the portion 271, without exceeding the maximum rated power of one or more power provisioning devices. The hardware accelerator 222 can comprise self-throttling functionality that can monitor the power consumption of the hardware accelerator 222 and can cause the hardware accelerator to transition to a lower power consuming execution mode should its power consumption increase beyond the quantity of power identified by the dynamic power router 330 as being available to the hardware accelerator 222. Such self-throttling functionality can, alternatively, be provided by the computer-executable instructions, such as those of the portion 271, that are being executed by the hardware accelerator 222.

The functionality of throttling the operation of a hardware accelerator can, according to another aspect, be provided by an external coordinator, including, for example an external coordinator that can execute as part of the dynamic power router 330. In such an instance, the dynamic power router 330 can establish a threshold amount of power available to the hardware accelerator, including power that the dynamic power router 330 has made available to the hardware accelerator by reducing the power consumption of other components 350, and the external coordinator can modify the execution mode of the hardware accelerator to ensure that the hardware accelerator does not exceed the established threshold amount of power.

One example of throttling functionality, with respect to the hardware accelerator, can be the provision of computer-executable instructions that are executable by the hardware accelerator and that provide for varying levels of hardware accelerator functionality. For example, analogously to idling or deactivating cores of generalized processing units, hardware accelerators can be provided with multiple accelerator designs for a given set of discrete functions that can fit into available power envelopes. As a specific example, a data compression accelerator can be provided with multiple, or "tiled", compression engines in the form of computer-executable instructions executable by such a hardware accelerator. One, two, three, or four engine versions, for example, could be loaded to be executed by the hardware accelerator based upon available power or other power-related thresholds. Analogously, such compression engines, for example, or any other like sets of computer-executable instructions, could be progressively loaded so as not to exceed the available power. In a like manner, multiple accelerators on a single hardware device could be accommodated.

Turning back to FIG. 2, the dynamic power router 330, whose operation was described in detail above, can be implemented in the form of functionality provided by one or more computing devices. For example, each of the server computing devices in the exemplary chassis 210, such as the exemplary server blades 220 and 230, can implement a local dynamic power router that can determine whether a local hardware accelerator is to be utilized, and how much power such a local hardware accelerator can consume. Thus, for example, a local dynamic power router being executed on the server blade 220 can determine whether a portion of a workflow, such as the exemplary portion 271 of the workflow 270, can be executed by the hardware accelerator 222 that is hosted by the server blade 220, and, if such an exemplary portion 271 can be executed by the hardware accelerator 222, a quantity of power that such a hardware accelerator 222 can consume. Each local dynamic power router can interact with other local dynamic power routers to facilitate the transfer of processing to a server blade that can make available a greater quantity of power to its hardware accelerator. Thus, for example, the local dynamic power router of the server blade 220 can communicate with the local dynamic power router of the server blade 230, and through such communications, the local dynamic power routers can determine that the server blade 230, for example, can make available a greater quantity of power for the hardware accelerator 232 and, consequently, the portion 271, of the exemplary work for 270, which was otherwise being executed by the CPU 221 of the server blade 220, can be transferred to the server blade 230 to be executed by the hardware accelerator 232 hosted thereby.

According to another aspect, centralized dynamic power routers can be executed by centralized control computing devices, such as the chassis computing device 240 and/or the centralized control computing device 260. Such centralized dynamic power routers can monitor multiple ones of the individual server blades, such as the exemplary individual server blades 220 and 230, and can perform analogous actions to those described above, except that such actions can be performed simultaneously across multiple individual server blades, and can more easily facilitate transfer of, for example, the portion 271 between server blades to facilitate the execution of the portion 271 on a hardware accelerator of a server blade consuming sufficiently little power such as the aggregate power consumption of the other components of that server blade, in combination with the power consumption of that server blade's hardware accelerator, do not exceed the maximum rated power of one or more power provisioning devices providing power to such a server blade.

Figure 4:
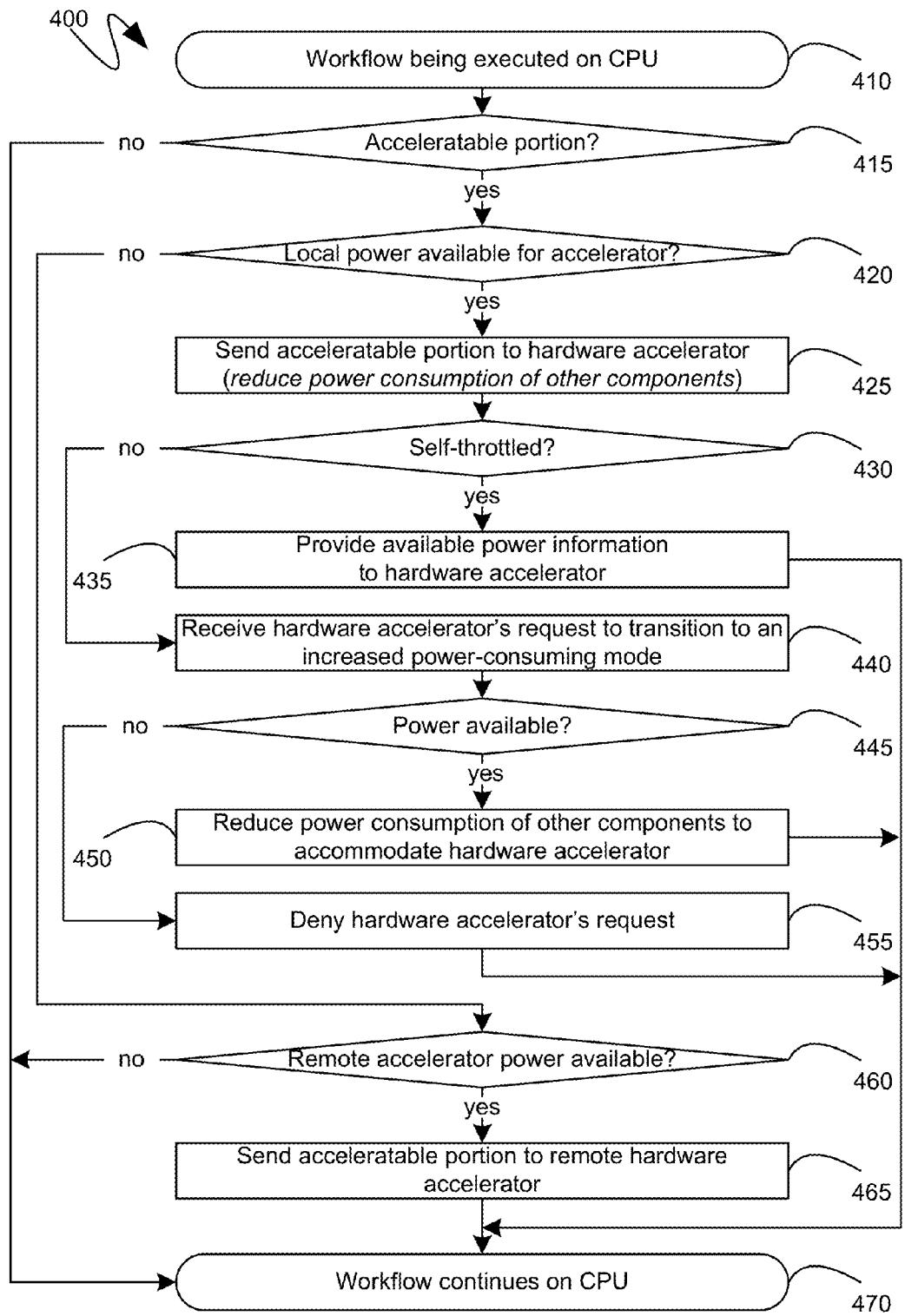
FIG. 4 is a flow diagram of an exemplary dynamic power routing to accommodate hardware accelerators.

Turning to FIG. 4, the exemplary flow diagram 400 shown therein illustrates an exemplary series of steps by which dynamic power routing can provide for the use of hardware accelerators on computing devices whose power provisioning devices have maximum rated power thresholds below that which would be consumed if the components of the computing device, including the hardware accelerators, were simultaneously utilized in high power utilization execution modes. The relevant processing can commence with the execution of a workflow on a generalized processing unit, such as a CPU, as illustrated by step 410 in FIG. 4. Subsequently, at step 415, a determination can be made as to whether at least a portion of that workflow is able to be accelerated by the hardware accelerators that are available. As indicated previously, hardware accelerators can be optimized for specific processing functionality, such as for the performance of specific computer-executable instructions for specific tasks. Consequently, in the performance of step 415, and analysis can be undertaken of whether at least a portion of the workflow being executed performs such tasks. Alternatively, the 415 can encompass the receipt of calls to specific application program interfaces by which portions of the workflow being executed can request their execution on hardware accelerators. If there are no portions of the workflow that are able to be accelerated, then the workflow can continue to be executed on the CPU, as indicated by step 470.

If, however, at step 415, it is determined that at least a portion of the workflow can be accelerated by being executed on one or more hardware accelerators, a subsequent decision, at step 420, can be made as to whether sufficient power can be routed to a local hardware accelerator to execute that portion of the workflow. As described in detail above, the routing of power to a hardware accelerator can comprise the transitioning, to lower power consuming states, of one or more other components of the computing device in which the workflow is being executed including, for example, transitioning one or more CPUs to slower execution frequencies, deactivating one or more cores of multicore CPUs and/or deactivating the sockets of multi-CPU motherboards. The determination, at step 420, can be further informed by a current amount of power being consumed by the local computing device in which the workflow is being executed, as well as an anticipated amount of power that would be consumed by the hardware accelerator in executing the portion of the workflow. For example, and as described in detail above, hardware accelerators can implement different execution modes that can consume differing amounts of power. Consequently, the determination, at step 420, can include determination of which execution mode the hardware accelerator would implement in executing the portion of the workflow assigned to it, and whether sufficient power could be routed to the hardware accelerator, such as by transitioning other components to lower power states, so that the maximum rated power, of one or more power provisioning devices of the computing device on which the work was being executed, would not be exceeded.

If, at step 420, it is determined that there is not sufficient local power available to execute the portion of the workflow on the hardware accelerator, then processing can proceed to step 460 where an analogous determination can be made for other computing devices that can also comprise analogous hardware accelerators. If those other computing devices comprise sufficient available power, such as can be determined at step 460, processing can proceed to step 465 and the portion of the workflow that is to be executed on the hardware accelerators can be transmitted to one or more such remote computing devices. As described in detail above, the determination, at step 460, and, indeed, all of the steps of the exemplary flow diagram 400, shown in FIG. 4, can be executed by centralized dynamic power routers that can coordinate the execution of portions of workflows on hardware accelerators across multiple computing devices, such as multiple blade server computing devices within a single chassis, or multiple computing devices across multiple chassis in a data center. If, at step 460, no other computing devices found to have sufficient power available to execute the portion of the workflow on a hardware accelerator, than the workflow can continue, as illustrated by step 470, to be executed on a generalized processing unit, such as the CPU of the computing device on which the workflow was being executed previously.

Returning back to step 420, if it is determined that there is sufficient local power available to execute the portion of the workflow on the hardware accelerator, then processing can proceed to step 425, and the portion of the workflow can be sent to the hardware accelerator to be executed thereby. As part of step 425, prior to the commencement of the execution of such a portion of a workflow, by the hardware accelerator, one or more other components of the computing system can be transitioned proactively to a lower power consuming state. As described in detail above, a dynamic power router can act in a predictive manner to proactively transition other components to lower power consuming state in anticipation of the power to be consumed by the hardware accelerator, thereby ensuring that the aggregate power consumption remains below a maximum rated power of one or more power provisioning devices. As also described in detail above, a dynamic power router can act in a reactive manner, and can wait for additional power to be requested by the hardware accelerator, such as prior to transitioning to a higher power consuming execution mode, before transitioning other components to lower power consuming states. Consequently, the act of reducing the power consumption of other components, such as by transitioning them to lower power consuming states, or deactivating them entirely, is italicized in step 425 to indicate that it is an optional action and can be implementation dependent.

At step 430, a determination can be made as to whether the portion of the workflow being executed by the hardware accelerator, or the hardware accelerator itself, is self throttled such that a given threshold power consumption amount will not be exceeded and the execution of the portion of the workflow by the hardware accelerator will itself transition between execution modes to maintain its power consumption below such a threshold power consumption amount. If the portion of the workflow being accelerated by the hardware accelerator, or the hardware accelerator itself, is self throttled, then processing can proceed to step 435 and the dynamic power router can provide available power information to the hardware accelerator, or the computer-executable instructions being executed thereby. As described in detail above, such information can include the amount of power that can be routed to the hardware accelerator should one or more components of the computing device be transitioned to lower power computing states. Alternatively, such information can include the amount of power that is currently available, where, if the hardware accelerator consumed that amount of power, the aggregate power consumption of the computing device would still not exceed the maximum rated power of one or more power provisioning devices providing power to such a computing device. As detailed above, with such information, a self throttled hardware accelerator or workflow portion can transition between execution modes of the hardware accelerator to ensure that the identified threshold power consumption amount is not exceeded while the hardware accelerator executes those computer-executable instructions that are part of the portion of the workflow. Processing can then return to the CPU, as represented by step 470.

If, at step 430, is determined that self throttling functionality is not available, then processing can proceed to steps 440 through 455, where throttling of the hardware accelerator can be performed by the dynamic power router. More specifically, at step 440, a request can be received from the hardware accelerator to transition to an increased power consuming execution mode. As explained previously, such an increased power consuming execution mode can be an execution mode that executes computer-executable instructions more efficiently, or with greater throughput. Subsequent to the receipt of such a request, at step 440, a determination can be made, at step 445, whether power is available to satisfy the request. As before, such a determination can be based on a quantity of power that can be made available should other components of the computing device be transitioned to lower power consuming states, or be deactivated entirely. Because the transitioning to lower power consuming states can entail a loss of performance, a further determination can be made as to whether such a loss of performance of other components of the computing device is acceptable given a corresponding increase in performance of the hardware accelerator in operating in the higher power consuming, and higher performance execution mode. If, at step 445, it is determined that additional power is not available for the hardware accelerator, or that the transitioning of other components to lower power consuming states would result in a disproportionately greater decrease in their performance than the corresponding increase in the performance of the hardware accelerator, then processing can proceed to step 455 and the request to allow the hardware accelerator to transition to a higher power consuming execution mode can be denied. Conversely, if, at step 455, it is determined that additional power can be routed to the hardware accelerator, such as by transitioning other components to lower power consuming states, then the dynamic power router can transition those components to lower power consuming states, and can subsequently respond to the request by enabling the hardware accelerator to transition to the increased power consuming execution mode, with at least some of the additional power being consumed by the hardware accelerator in the increased power consuming execution mode being accommodated by the power savings from those components that were transitioned to lower power consuming states. Steps 440 through 455 and then repeat during the processing of the portion of the workflow by the hardware accelerator, whereupon the results can be returned to other computer executable instructions of the workflow executing on the CPU, and the execution of the workflow can continue on the CPU, as represented by step 470.

The descriptions above include, as a first example, a computing device comprising: a generalized central processing unit; a hardware accelerator pre-configured to perform a discrete set of computing operations more efficiently than the generalized central processing unit, the discrete set of computing operations being only a subset of a larger set of computing operations performable by the generalized central processing unit; an electrical power provisioning device having a maximum rated power, wherein utilization of the hardware accelerator in at least one processing mode can result in the computing device requiring a greater amount of electrical power than the maximum rated power of the electrical power provisioning device; and one or more computer-readable storage media comprising computer-executable instructions directed to steps comprising: identifying a workflow portion comprising at least some of the discrete set of computing operations that can be performed more efficiently by the hardware accelerator, the workflow being executed by the generalized central processing unit; causing the identified workflow portion to be executed by the hardware accelerator; and placing the generalized central processing unit into a reduced power consuming mode, wherein the execution of the identified workflow portion by the hardware accelerator would exceed the maximum rated power of the electrical power provisioning device but for the placing of the generalized central processing unit into the reduced power consuming mode.

A second example is the computing device of the first example, wherein the computer-executable instructions directed to the identifying the workflow comprise computer-executable instructions for receiving, via an interface, a call from the workflow requesting that the workflow portion be executed by the hardware accelerator.

A third example is the computing device of the first example, wherein the generalized central processing unit is placed into the reduced power consuming state prior to the execution of the identified workflow portion by the hardware accelerator.

A fourth example is the computing device of the third example, wherein the one or more computer-readable storage media comprise further computer-executable instructions for providing, to either the hardware accelerator or the workflow portion being executed by the hardware accelerator, an available amount of power, after the generalized central processing unit is placed into the reduced power consuming state, that can be consumed by the hardware accelerator in executing the workflow portion while remaining under the maximum rater power of the electrical power provisioning device, the hardware accelerator or the workflow portion being executed by the hardware accelerator being self-throttling to stay within the provided available amount of power.

A fifth example is the computing device of the first example, wherein the generalized central processing unit is placed into the reduced power consuming state after execution of the identified workflow portion by the hardware accelerator has commenced.

A sixth example is the computing device of the fifth example, wherein the one or more computer-readable storage media comprise further computer-executable instructions for: receiving a request, from either the hardware accelerator or the workflow portion being executed by the hardware accelerator, to transition the hardware accelerator to a higher power consuming execution mode; and authorizing the hardware accelerator to transition to the higher power consuming execution mode, in response to the request, only after the placing of the generalized central processing unit into the reduced power consuming mode.

A seventh example is the computing device of the first example, wherein the one or more computer-readable storage media comprise further computer-executable instructions for predicting an amount of power that will be consumed by the hardware accelerator in executing the identified workflow portion; and wherein the computer-executable instructions for causing the identified workflow portion to be executed by the hardware accelerator are only executed if the predicted amount of power that will be consumed by the hardware accelerator, in aggregate with an amount of power consumed by other components of the computing device after the generalized central processing unit is placed into the reduced power consuming mode, is still less than the maximum rated power of the electrical power provisioning device.

An eighth example is the computing device of the seventh example, wherein computer-executable instructions for predicting an amount of power that will be consumed by the hardware accelerator in executing the identified workflow portion comprise computer-executable instructions for identifying an execution mode of the hardware accelerator in executing the identified workflow portion.

A ninth example is the computing device of the first example, further comprising a second generalized central processing unit communicationally coupled to the computing device through a socket; wherein the one or more computer-readable storage media comprise further computer-executable instructions for deactivating the socket.

A tenth example is the computing device of the first example, wherein the generalized central processing unit comprises multiple processing cores; and wherein further the computer-executable instructions for placing the generalized central processing unit into the reduced power consuming mode comprise computer-executable instructions for deactivating at least one of the multiple processing cores of the generalized central processing unit.

An eleventh example is the computing device of the first example, further comprising one or more computer-readable storage devices and one or more network interface devices; and wherein the one or more computer-readable storage media comprise further computer-executable instructions for either deactivating or placing into a reduced power consuming mode at least one of the one or more computer-readable storage devices or at least one of the one or more network interface devices, wherein the execution of the identified workflow portion by the hardware accelerator would exceed the maximum rated power of the electrical power provisioning device but for the placing of the at least one of the one or more computer-readable storage devices or the at least one of the one or more network interface devices into the reduced power consuming mode.

A twelfth example is a system comprising: a first computing device comprising a first generalized central processing unit and a first hardware accelerator pre-configured to perform a discrete set of computing operations more efficiently than the first generalized central processing unit, the discrete set of computing operations being only a subset of a larger set of computing operations performable by the first generalized central processing unit; a second computing device, differing from the first computing device, the second computing device comprising second generalized central processing unit and a second hardware accelerator pre-configured to perform the discrete set of computing operations more efficiently than the second generalized central processing unit; an electrical power provisioning device having a maximum rated power; and one or more computer-readable storage media comprising computer-executable instructions directed to steps comprising: identifying a workflow portion comprising at least some of the discrete set of computing operations, the workflow being executed by the first generalized central processing unit; identifying one of either the first computing device or the second computing device that can execute the identified workflow portion with a corresponding one of the first hardware accelerator or the second hardware accelerator, respectively, while maintaining an aggregate power consumption below the maximum rated power; and causing the identified one of the first or second computing devices to execute the identified workflow portion with the corresponding one of the first or second hardware accelerators.

A thirteenth example is the system of the twelfth example, further comprising a centralized control computing device, separate from the first and the second computing devices, the centralized control computing device executing the computer-executable instructions.

A fourteenth example is the system of the twelfth example, wherein the identified one of either the first or second computing devices is the second computing device; and wherein further the computer-readable storage media comprises further computer-executable instructions for transferring the identified workflow portion from the first computing device to the second computing device.

A fifteenth example is the system of the twelfth example, wherein the computer-readable storage media comprises further computer-executable instructions for placing a corresponding one of the first or second generalized central processing units, corresponding to the identified one of the first or second computing devices, into a reduced power consuming mode; and wherein further the execution of the identified workflow portion, by the corresponding one of the first or second hardware accelerators, would exceed the maximum rated power of the electrical power provisioning device but for the placing of the corresponding one of the first or second generalized central processing units into the reduced power consuming mode.

A sixteenth example is the system of the twelfth example, wherein the computer-executable instructions directed to the identifying the workflow comprise computer-executable instructions for receiving, via an interface, a call from the workflow requesting that the workflow portion be executed by a hardware accelerator.

A seventeenth example is the system of the twelfth example, wherein the one or more computer-readable storage media comprise further computer-executable instructions for providing, to the corresponding one of the first or second hardware accelerators or the workflow portion being executed thereby, an available amount of power that can be consumed by the corresponding one of the first or second hardware accelerators in executing the workflow portion while remaining under the maximum rater power of the electrical power provisioning device, the corresponding one of the first or second hardware accelerators or the workflow portion being self-throttling to stay within the provided available amount of power.

An eighteenth example is the system of the twelfth example, wherein the one or more computer-readable storage media comprise further computer-executable instructions for: receiving a request to transition the corresponding one of the first or second hardware accelerators to a higher power consuming execution mode; and authorizing the corresponding one of the first or second hardware accelerators to transition to the higher power consuming execution mode, in response to the request, only after placing a corresponding one of the first or second generalized central processing units, corresponding to the identified one of the first or second computing devices, into a reduced power consuming mode.

A nineteenth example is the system of the twelfth example, wherein the one or more computer-readable storage media comprise further computer-executable instructions for identifying an execution mode of the corresponding one of the first or second hardware accelerators in executing the identified workflow portion.

A twentieth example is a hardware accelerator comprising: one or more processing units pre-configured to perform a discrete set of computing operations more efficiently than a generalized central processing unit, the discrete set of computing operations being only a subset of a larger set of computing operations performable by the generalized central processing unit; and one or more computer-readable storage media comprising computer-executable instructions which, when executed by the hardware accelerator, cause the hardware accelerator to perform steps comprising: monitoring a power consumption of the hardware accelerator while the hardware accelerator executes a workflow portion comprising at least some of the discrete set of computing operations that can be performed more efficiently by the hardware accelerator, the workflow being executed by the generalized central processing unit; alternatively transitioning the hardware accelerator to a higher power consuming execution mode or a lower power consuming execution mode, in response to the execution of the workflow portion, so as to maintain the power consumption of the hardware accelerator below a provided threshold.

As can be seen from the above descriptions, mechanisms for dynamically routing power to hardware accelerators have been presented. In view of the many possible variations of the subject matter described herein, we claim as our invention all such embodiments as may come within the scope of the following claims and equivalents thereto.

We claim:

1. A computing device comprising:
   a generalized central processing unit having a reduced power consuming mode during which the generalized central processing unit consumes less power than during a higher power consuming mode, and executes more slowly than during a higher power consuming mode;
   a hardware accelerator pre-configured to perform a discrete set of computing operations more efficiently than the generalized central processing unit, the discrete set of computing operations being only a subset of a larger set of computing operations performable by the generalized central processing unit;
   an electrical power provisioning device having a maximum rated power, wherein utilization of the hardware accelerator in at least one processing mode can result in the computing device requiring a greater amount of electrical power than the maximum rated power of the electrical power provisioning device; and
   one or more computer-readable storage media comprising computer-executable instructions, which, when executed, cause the computing device to:
   identify a workflow portion comprising at least some of the discrete set of computing operations that can be performed more efficiently by the hardware accelerator, the workflow being executed by the generalized central processing unit; and
   cause the identified workflow portion to be executed by the hardware accelerator only if both: (1) the computing device determines that its power consumption when the identified workflow portion is executed by the hardware accelerator, in combination with continued execution of other portions of the workflow by the generalized central processing unit would exceed the maximum rated power of the electrical power provisioning device but further determines that placing the generalized central processing unit into the reduced power consuming mode would avoid the exceeding the maximum rated power of the electrical power provisioning device and (2) the computing device further determines that execution of the identified workflow portion by the hardware accelerator, in combination with the continued execution of the other portions of the workflow by the generalized central processing unit operating in the reduced power consuming mode, will result in completion of the workflow more efficiently than if both the identified workflow portion and the other portions of the workflow were executed by the generalized central processing unit executing in the higher power consuming mode.

2. The computing device of claim 1, wherein the computer-executable instructions directed to the identifying the workflow comprise computer-executable instructions, which, when executed, cause the computing device to receive, via an interface, a call from the workflow requesting that the workflow portion be executed by the hardware accelerator.

3. The computing device of claim 1, wherein the one or more computer-readable storage media comprise further computer-executable instructions, which, when executed, cause the computing device to provide, to either the hardware accelerator or the workflow portion being executed by the hardware accelerator, an available amount of power, after the generalized central processing unit is placed into the reduced power consuming mode, that can be consumed by the hardware accelerator in executing the workflow portion while remaining under the maximum rater power of the electrical power provisioning device, the hardware accelerator or the workflow portion being executed by the hardware accelerator being self-throttling to stay within the provided available amount of power.

4. The computing device of claim 1, wherein the one or more computer-readable storage media comprise further computer-executable instructions, which, when executed, cause the computing device to:
   receive a request, from either the hardware accelerator or the workflow portion being executed by the hardware accelerator, to transition the hardware accelerator to a higher power consuming execution mode; and
   authorize the hardware accelerator to transition to the higher power consuming execution mode, in response to the request, only after placing the generalized central processing unit into a further reduced power consuming mode.

5. The computing device of claim 1, wherein the one or more computer-readable storage media comprise further computer-executable instructions, which, when executed, cause the computing device to predict an amount of power that will be consumed by the hardware accelerator in executing the identified workflow portion.

6. The computing device of claim 5, wherein computer-executable instructions for predicting an amount of power that will be consumed by the hardware accelerator in executing the identified workflow portion comprise computer-executable instructions, which, when executed, cause the computing device to identify an execution mode of the hardware accelerator in executing the identified workflow portion.

7. The computing device of claim 1 further comprising a second generalized central processing unit communicationally coupled to the computing device through a socket; wherein the one or more computer-readable storage media comprise further computer-executable instructions, which, when executed, cause the computing device to deactivate the socket.

8. The computing device of claim 1, wherein the generalized central processing unit comprises multiple processing cores; and wherein further the computer-executable instructions for placing the generalized central processing unit into the reduced power consuming mode comprise computer-executable instructions, which, when executed, cause the computing device to deactivate at least one of the multiple processing cores of the generalized central processing unit.

9. The computing device of claim 1, further comprising one or more computer-readable storage devices and one or more network interface devices; and wherein the one or more computer-readable storage media comprise further computer-executable instructions, which, when executed, cause the computing device to either deactivating or placing into a reduced power consuming mode at least one of the one or more computer-readable storage devices or at least one of the one or more network interface devices, wherein the execution of the identified workflow portion by the hardware accelerator would exceed the maximum rated power of the electrical power provisioning device but for the placing of the at least one of the one or more computer-readable storage devices or the at least one of the one or more network interface devices into the reduced power consuming mode.

10. A system comprising:
a first computing device comprising a first generalized central processing unit having a reduced power consuming mode during which the first generalized central processing unit consumes less power than during a higher power consuming mode, and executes more slowly than during a higher power consuming mode and a first hardware accelerator pre-configured to perform a discrete set of computing operations more efficiently than the first generalized central processing unit, the discrete set of computing operations being only a subset of a larger set of computing operations performable by the first generalized central processing unit;
a second computing device, differing from the first computing device, the second computing device comprising a second generalized central processing unit and a second hardware accelerator pre-configured to perform the discrete set of computing operations more efficiently than the second generalized central processing unit;
an electrical power provisioning device having a maximum rated power; and
one or more computer-readable storage media comprising computer-executable instructions, which, when executed, cause a computing device executing the computer-executable instructions to:
identify a workflow portion comprising at least some of the discrete set of computing operations, the workflow being executed by the first generalized central processing unit;
first, cause the identified workflow portion to be executed by the first hardware accelerator only if both: (1) the computing device executing the computer-executable instructions determines that a power consumption of the first computing device when the identified workflow portion is executed by the first hardware accelerator, in combination with continued execution of other portions of the workflow by the first generalized central processing unit would exceed the maximum rated power of the electrical power provisioning device but further determines that placing the first generalized central processing unit into a reduced power consuming mode would avoid the exceeding the maximum rated power of the electrical power provisioning device and (2) the computing device executing the computer-executable instructions further determines that execution of the identified workflow portion by the first hardware accelerator, in combination with the continued execution of the other portions of the workflow by the first generalized central processing unit operating in the reduced power consuming mode, will result in completion of the workflow more efficiently than if both the identified workflow portion and the other portions of the workflow were executed by the first generalized central processing unit executing in a higher power consuming mode; and
second, causing the identified workflow portion to be executed by the second hardware accelerator only if both: (1) the identified workflow portion has not been caused to be executed by the first hardware accelerator and (2) the computing device executing the computer-executable instructions determines that a power consumption of the second computing device when the identified workflow portion is executed by the second hardware accelerator would avoid the exceeding the maximum rated power of the electrical power provisioning device.

11. The system of claim 10, further comprising a centralized control computing device, separate from the first and the second computing devices, the centralized control computing device being the computing device executing the computer-executable instructions.

12. The system of claim 10, wherein the computer-readable storage media comprises further computer-executable instructions, which, when executed, cause the computing device executing the computer-executable instructions to transfer the identified workflow portion from the first computing device to the second computing device if the identified workflow portions is caused to be executed by the second hardware accelerator.

13. The system of claim 10, wherein the computer-executable instructions directed to the identifying the workflow comprise computer-executable instructions, which, when executed, cause the computing device executing the computer-executable instructions to receive, via an interface, a call from the workflow requesting that the workflow portion be executed by a hardware accelerator.

14. A system of claim 10, wherein the one or more computer-readable storage media comprise further computer-executable instructions, which, when executed, cause the computing device executing the computer-executable instructions to provide, to either the first or second hardware accelerators or to the workflow portion being executed thereby, an available amount of power that can be consumed by the first or second hardware accelerators in executing the workflow portion while remaining under the maximum rater power of the electrical power provisioning device, the first or second hardware accelerators or the workflow portion being self-throttling to stay within the provided available amount of power.

15. The system of claim 10, wherein the one or more computer-readable storage media comprise further computer-executable instructions, which, when executed, cause the computing device executing the computer-executable instructions to:
receive a request to transition the first or second hardware accelerators to a higher power consuming execution mode; and
authorize the first or second hardware accelerators to transition to the higher power consuming execution mode, in response to the request, only after placing a corresponding one of the first or second generalized central processing units into a further reduced power consuming mode.

16. The system of claim 10, wherein the one or more computer-readable storage media comprise further computer-executable instructions, which, when executed, cause the computing device executing the computer-executable instructions to identify an execution mode of the first or second hardware accelerators in executing the identified workflow portion.

17. A method for accelerating execution of a workflow on a computing device while maintaining computing device power consumption below a threshold amount, the method comprising:
identifying, by the computing device, a workflow portion comprising at least some of the discrete set of computing operations that can be performed more efficiently by a hardware accelerator of the computing device, the workflow being executed by the generalized central processing unit; and executing the identified workflow portion on the hardware accelerator only if both: (1) the computing device determines that its power consumption when the identified workflow portion is executed by the hardware accelerator, in combination with continued execution of other portions of the workflow by a generalized central processing unit of the computing device, would exceed the maximum rated power of the electrical power provisioning device but further determines that placing the generalized central processing unit of the computing device into a reduced power consuming mode would avoid the exceeding a maximum rated power of an electrical power provisioning device of the computing device and (2) the computing device further determines that execution of the identified workflow portion by the hardware accelerator, in combination with the continued execution of the other portions of the workflow by the generalized central processing unit operating in the reduced power consuming mode, will result in completion of the workflow more efficiently than if both the identified workflow portion and the other portions of the workflow were executed by the generalized central processing unit executing in a higher power consuming mode during which the generalized central processing unit consumes more power than during the reduced power consuming mode, and executes more quickly than during the reduced power consuming mode.

18. The method of claim 17, wherein the identifying the workflow portion comprises receiving, via an interface, a call from the workflow requesting that the workflow portion be executed by the hardware accelerator.

19. The method of claim 17, further comprising: providing to either the hardware accelerator or the workflow portion being executed by the hardware accelerator, an available amount of power, after the generalized central processing unit is placed into the reduced power consuming mode, that can be consumed by the hardware accelerator in executing the workflow portion while remaining under the maximum rater power of the electrical power provisioning device, the hardware accelerator or the workflow portion being executed by the hardware accelerator being self-throttling to stay within the provided available amount of power.

20. The method of claim 17, further comprising:
receiving a request, from either the hardware accelerator or the workflow portion being executed by the hardware accelerator, to transition the hardware accelerator to a higher power consuming execution mode; and
authorizing the hardware accelerator to transition to the higher power consuming execution mode, in response to the request, only after placing the generalized central processing unit into a further reduced power consuming mode.

* * * * *